United States Patent
Nathwani et al.

(10) Patent No.: US 9,584,979 B2
(45) Date of Patent: Feb. 28, 2017

(54) SERVER BEHAVIOR BASED ON PAIRED DEVICE IDENTIFICATION

(71) Applicant: BlackBerry Limited, Waterloo (CA)

(72) Inventors: Sanjay Nathwani, Mississauga (CA); Charles Angus Duffy, Waterloo (CA); Devendra Jugdeo, Mississauga (CA); Allan Jeffrey Stirrett, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 530 days.

(21) Appl. No.: 13/922,840

(22) Filed: Jun. 20, 2013

(65) Prior Publication Data
US 2014/0379920 A1 Dec. 25, 2014

(51) Int. Cl.
  *G06F 15/173* (2006.01)
  *H04W 4/04* (2009.01)
(52) U.S. Cl.
  CPC .................................. *H04W 4/04* (2013.01)
(58) Field of Classification Search
  None
  See application file for complete search history.

(56) References Cited

U.S. PATENT DOCUMENTS

| | | | |
|---|---|---|---|
| 2006/0116800 A1* | 6/2006 | Obradovich | G01C 21/26 701/31.4 |
| 2010/0037057 A1 | 2/2010 | Shim et al. | |
| 2011/0301839 A1* | 12/2011 | Pudar | H04W 4/046 701/408 |
| 2013/0046510 A1 | 2/2013 | Bowne et al. | |
| 2013/0244624 A1* | 9/2013 | Das | H04W 4/04 455/414.1 |
| 2014/0187149 A1* | 7/2014 | Lortz | H04W 4/008 455/41.1 |
| 2014/0277937 A1* | 9/2014 | Scholz | G06F 7/00 701/36 |

FOREIGN PATENT DOCUMENTS

| | | | | |
|---|---|---|---|---|
| EP | 1972895 A2 | 9/2008 | | |
| EP | 2388698 A1 | 11/2011 | | |
| GB | 2379310 A | * | 3/2003 | G08G 1/20 |
| JP | 2004340596 A | * | 12/2004 | |
| KR | 20100068606 A | * | 6/2010 | |

OTHER PUBLICATIONS

European Search Report from corresponding EP application 13173116.8 dated Sep. 30, 2013.

* cited by examiner

*Primary Examiner* — Jeffrey R Swearingen
(74) *Attorney, Agent, or Firm* — Gowling WLG (Canada) LLP

(57) ABSTRACT

A method on a server for providing content to a mobile device is provided. Paired device identity information associated with a device that has been paired to the mobile device is received. Content available from the server based upon the paired device identity information is determined and sent to the mobile device.

15 Claims, 8 Drawing Sheets

SERVER BEHAVIOR BASED ON PAIRED DEVICE IDENTIFICATION

TECHNICAL FIELD

The present disclosure relates to pairing of mobile devices and in particular to providing content from a server to mobile devices based on paired device identification.

BACKGROUND

The pairing of mobile devices, such as smartphones or tablet devices, with other electronic devices such as in-vehicle infotainment systems can enable hands-free access to data sharing and communication functions provided by the mobile devices. The paired device can act as an extension of the mobile device and provide features and functions either provided from, in addition to, or integrated with the mobile device. During pairing of the mobile device receives a device identifier which provides identification of the paired electronic device, such as an in-vehicle infotainment system, that enables subsequent pairings. Although the mobile device maintains pairing configuration information this information is only utilized to configure the pairing process. When accessing content from a server, the user of the mobile device may be associated with a user identifier or mobile device identifier which enables selection of content to be tailored to the user or the mobile device, however content selection from the server is limited based on the user identifier, mobile device identifier and past content selections.

Accordingly, systems and methods that enable server behavior based paired device identification remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of present disclosure there is provided a method on a server comprising: receiving from a mobile device, paired device identity information associated with a device that has been paired to the mobile device; determining content available from the server based upon the paired device identity information; and sending the determined content to the mobile device.

In accordance with another aspect of the present disclosure there is provided a non-transitory computer readable memory containing instructions in code which when stored in memory and when executed by a processor of a server, cause the server to: receive from a mobile device, paired device identity information associated with a device that has been paired to the mobile device; determine content available from the server based upon the paired device identity information; and send the determined content to the mobile device.

In accordance with yet another aspect of the present disclosure there is provided a non-transitory computer readable memory containing instructions in code which when stored in memory and when executed by a processor of a server, cause the server to: receive from a mobile device, paired device identity information associated with a device that has been paired to the mobile device; determine content available from the server based upon the paired device identity information; and send the determined content to the mobile device.

Figure 1:
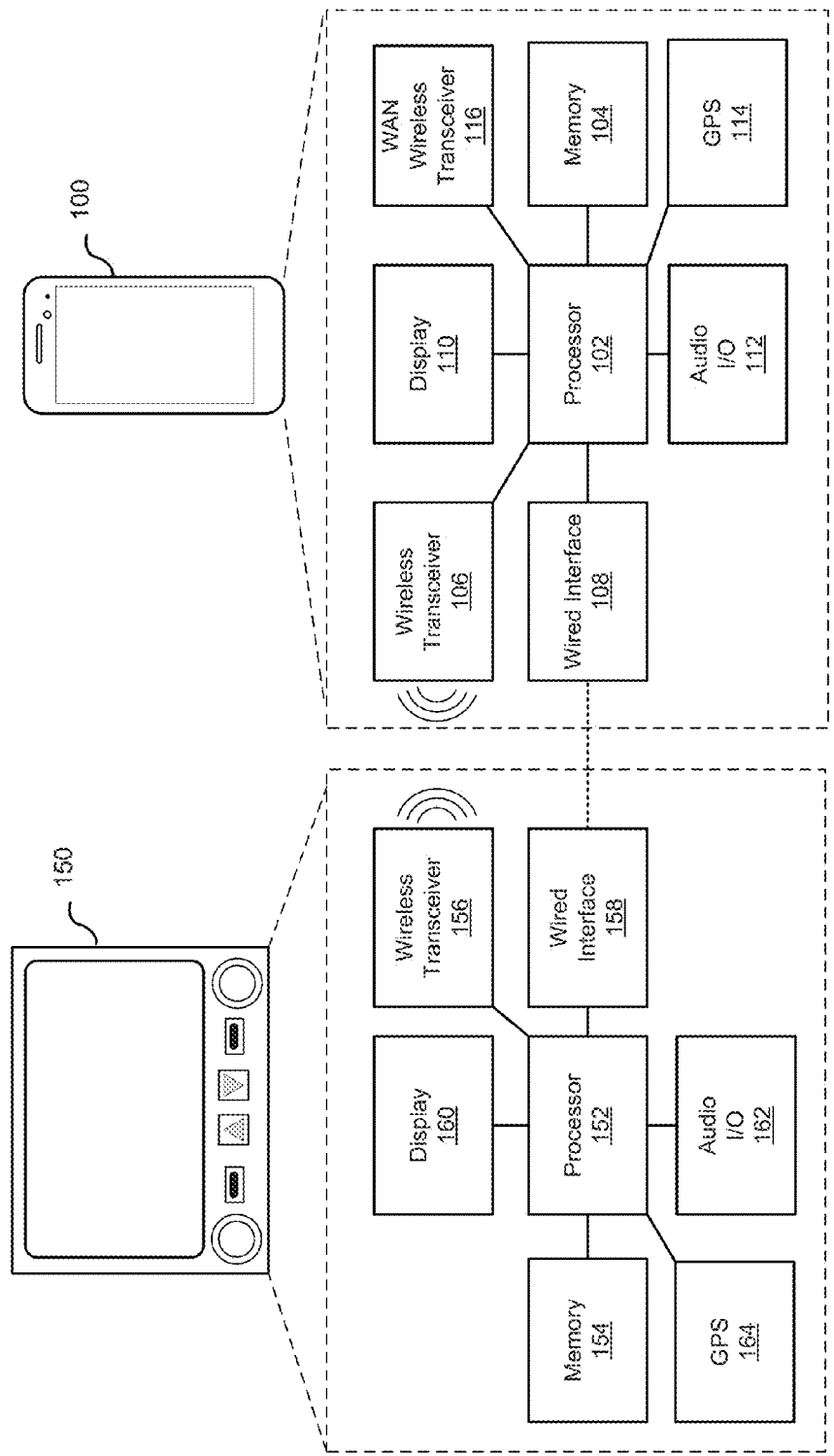
FIG. 1 shows a representation of a paired in-vehicle infotainment system and a mobile device.

Embodiments are described below, by way of example only, with reference to FIGS. 1-8. FIG. 1 shows a representation of a paired in-vehicle entertainment and information (infotainment) system and a mobile device. A mobile device 100, such as a smartphone or tablet computing device, can pair with a device, in-vehicle infotainment system 150, to augment services provided to the paired device. The mobile device 100 may be built on a mobile operating system providing, for example, advanced computing capability and connectivity for communications, accessing content and playback of media content. The in-vehicle infotainment system 150 can provide, for example, rear-seat entertainment (such as movies, games, TV, social networking, etc.), navigation, audio playback (AM/FM, CD, DVD, HDD, satellite radio, internet radio), location-based services and external communications.

The pairing of the mobile device 100 to the in-vehicle infotainment system 150 enables services or functionality of the mobile device 100 to be accessed via the in-vehicle infotainment system 150. The in-vehicle infotainment system 150 can access communication functions such as SMS, MMS, voice, video, and e-mail and access content stored on the mobile device 100 or accessible by the mobile device via a network interface in various formats such as but not limited to AAC, AMR, FLAC, MP3, M4A, OGG, WMA, WAV, Video, 3GP, AVI, ASF, MP4, MOV and WMV format content can be accessible once paired. The pairing may be performed by a wireless technology such as Bluetooth™ or Wi-Fi direct or by wired technology such as Universal Serial Bus (USB), Firewire™, IEEE 1394, or Thunderbolt™ connections implementing a pairing protocol.

During the pairing process the mobile device 100 obtains identity information related to the vehicle or infotainment system. The identity information of the paired device may identify, for example, one or more of the manufacturer of the vehicle, model of vehicle, year of manufacture, as well as one or more package options. Although described as providing information related to the automobile manufacturer, it is contemplated that the identity information may be obtained in relation to the in-vehicle infotainment system, and may include a manufacturer of the in-vehicle infotainment system as well as product information. The paired device identity information may be received from the paired device 150 as part of the pairing process, or may be retrieved from a remote server. For example, a paired device may be associated with a unique identifier. Manufacturers of the paired device may provide a mapping between a unique identifier, or ranges or blocks of unique identifiers, and associated identity information such as the product or device name associated with the respective unique identifiers. Additionally or alternatively, the mobile device 100 can provide selection options for the user to interact with the user (e.g. by providing a pick list) to specify identity information of the paired device. Once the identity information of the paired device (e.g. vehicle) is known it can be stored on the mobile device 100 for current and future use.

The mobile device 100 comprises a processor 102 coupled to a memory 104. The memory 104 contains instructions for providing an operating system, databases, and communication functions such as pairing to the in-vehicle infotainment system 150 by establishing a connection by one or more interfaces such as a wireless transceiver 106 or wired interface 108. The memory may also provide instructions for storing or retrieving or data, applications and media content. The wireless transceiver 106 may support one or more personal area network (PAN) technologies such as Bluetooth® (Bluetooth is a trademark of the Bluetooth SIG of Kirkland, Wash.), near field communications (NFC), or local area networks (LAN) based technologies such as IEEE 802 family technologies including Wi-Fi® (Wi-Fi is a registered trademark of Wi-Fi Alliance of Austin, Tex.). The mobile device 100 also provides a display 110, which can provide a touch-sensitive input to the operating system. A wide area network (WAN) wireless transceiver 116 is provided to access mobile networks GSM, EDGE, UMTS/UTRA, 3G (3GPP), and 4G (LTE) and beyond. Audio input and output functions 112 such as speaker and microphone are incorporated into the mobile device 100. In addition a Global Position System (GPS) or Global Navigation Satellite System (GNSS) receiver 114 may be provided for location services and navigation.

The in-vehicle infotainment system 150 comprises a processor 152 coupled to a memory 154. The memory 154 contains instructions for providing an operating system and communication functions such as pairing to the mobile device 100 by establishing a connection by one or more interfaces such as a wireless transceiver 156 or wired interface 158. The wireless transceiver 156 may support one or more personal area networks (PAN) technologies such as Bluetooth®, or local area networks (LAN) such as Wi-Fi® or other technologies based on the IEEE 802 family. The in-vehicle infotainment system 150 also provides a display 160, which can provide a touch-sensitive input or may also have physical interfaces as a button or dials. In addition a Global Position System (GPS) or Global Navigation Satellite System (GNSS) receiver 164 may be provided. Audio input and output functions 162 such as speaker and microphone are incorporated. The in-vehicle infotainment system 150 can provide communications functions from the mobile device 100, for example hands-free call access, media playback, message service functions can be interfaced through the in-vehicle infotainment system 150. The pairing process connects the mobile device 100 and the in-vehicle infotainment system 150 to exchange data between devices. Although the paired device is described as an in-vehicle infotainment system 150, the pair device behavior may also be defined in relation of other devices for example as a hands-free headset, and audio playback device, or an audio gateway.

Figure 2:
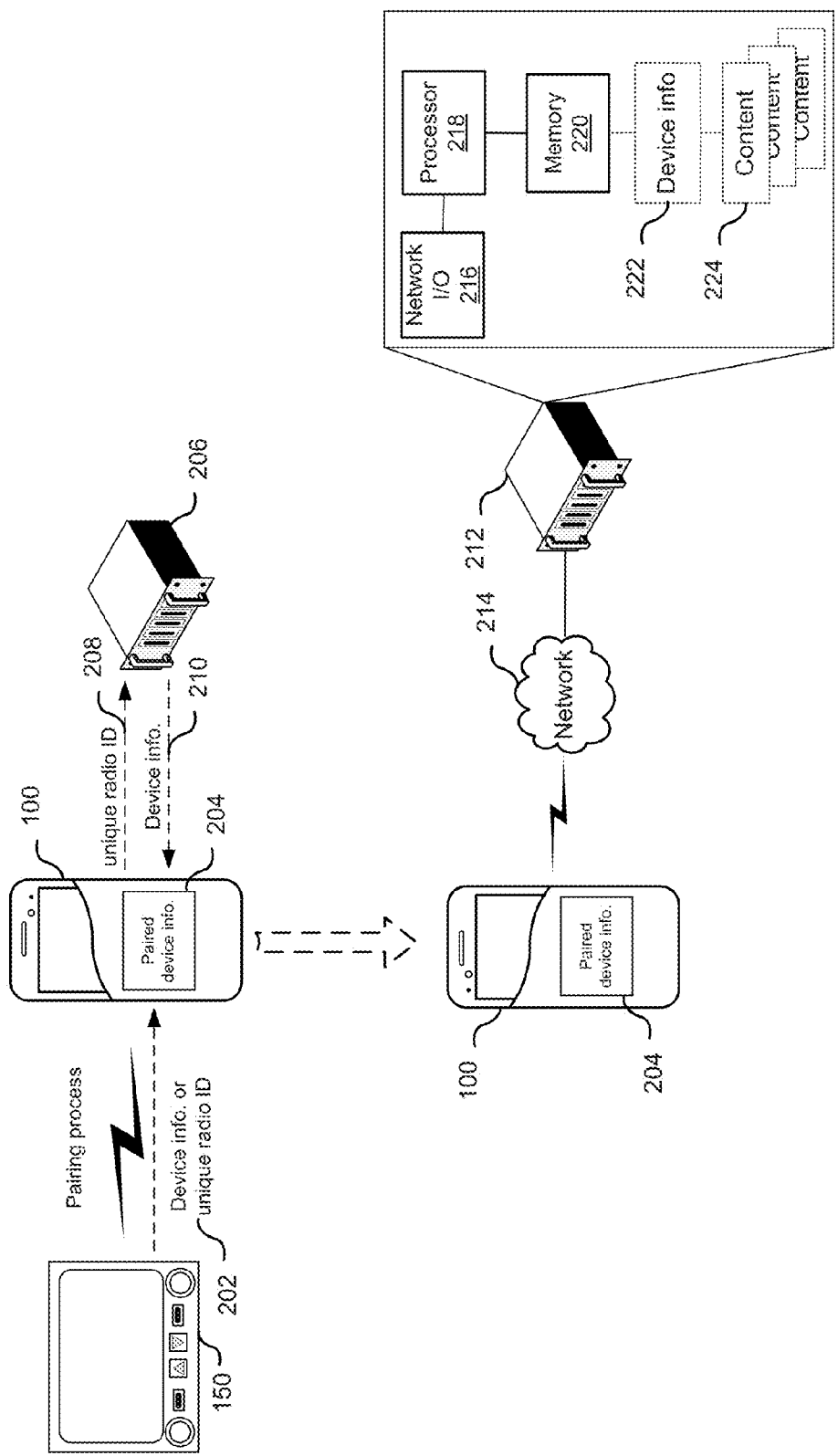
FIG. 2 shows a representation of a system for providing content to the mobile device in relation to the paired device identification information.

FIG. 2 provides a representation of a system for providing content to the mobile device in relation to the paired in-vehicle infotainment system. During an initial pairing of the mobile device 100 to the in-vehicle infotainment system 150, information 202 may be exchanged. The exchanged information 202 may include a unique device identifier, for example a Bluetooth address, and/or device string. The device string or label information may be specified by the device manufacturer and may be presented to the user during the pairing process. Additionally, or alternatively, the exchanged information may include device identity information that may, for example, identify a maker or manufacturer of the product or device as well as a product or device information such as a make and model information. If the exchanged information 202 comprises identity information of the paired device it may be stored at the mobile device 100 as the paired device identity information 204. If the exchanged information 202 does not include paired device identity information, the mobile device 100 may use the exchanged information 202 to retrieve associated identity information. The identity information may be retrieved or determined based on the unique ID and/or the device string either from information stored on the mobile device 100 or from a remote server 206. For example, if the exchanged information includes a unique device identifier, the mobile device 100 may provide the unique device identifier 208, such as a unique radio ID, to the remote server 206, which may determine device identity information associated with the unique ID and return the device identity information 210 to the mobile device 100.

Regardless of how the paired device identity information 204 is obtained by the mobile device 100, it can subsequently be provided by the mobile device 100 to a server 212 through a network 214 when attempting to retrieve content. The content may, for example, be applications from an application store that are retrieved or presented to the user based upon the paired device identity information. Accordingly, the content returned or presented to the user may be directed to or associated with the paired device. The content provided may be identified by the manufacturer of the vehicle or the in-vehicle infotainment system 150 as being of use or of interest to the user of the mobile device 100 or complimentary to the in-vehicle entertainment system 150. Although the content is described in regards to the identification of applications to the user, the content may be audio, video, applications, or web content that can be executed or displayed on the mobile device 100.

The server 212 comprises a network I/O interface 216 for communicating with the network 214, a processor 218 for executing instructions stored in a memory 220. The server 212, upon receiving the paired device identity information 204 from the mobile device 100, can select content 224 associated with paired device identity information 222 matching, or corresponding to, the providing paired device identity information 204 to be provided or displayed on the mobile device 100. The content selection may also be associated with a user identifier and preferences of the user as to determine the type of content that should be provided.

Figure 3:
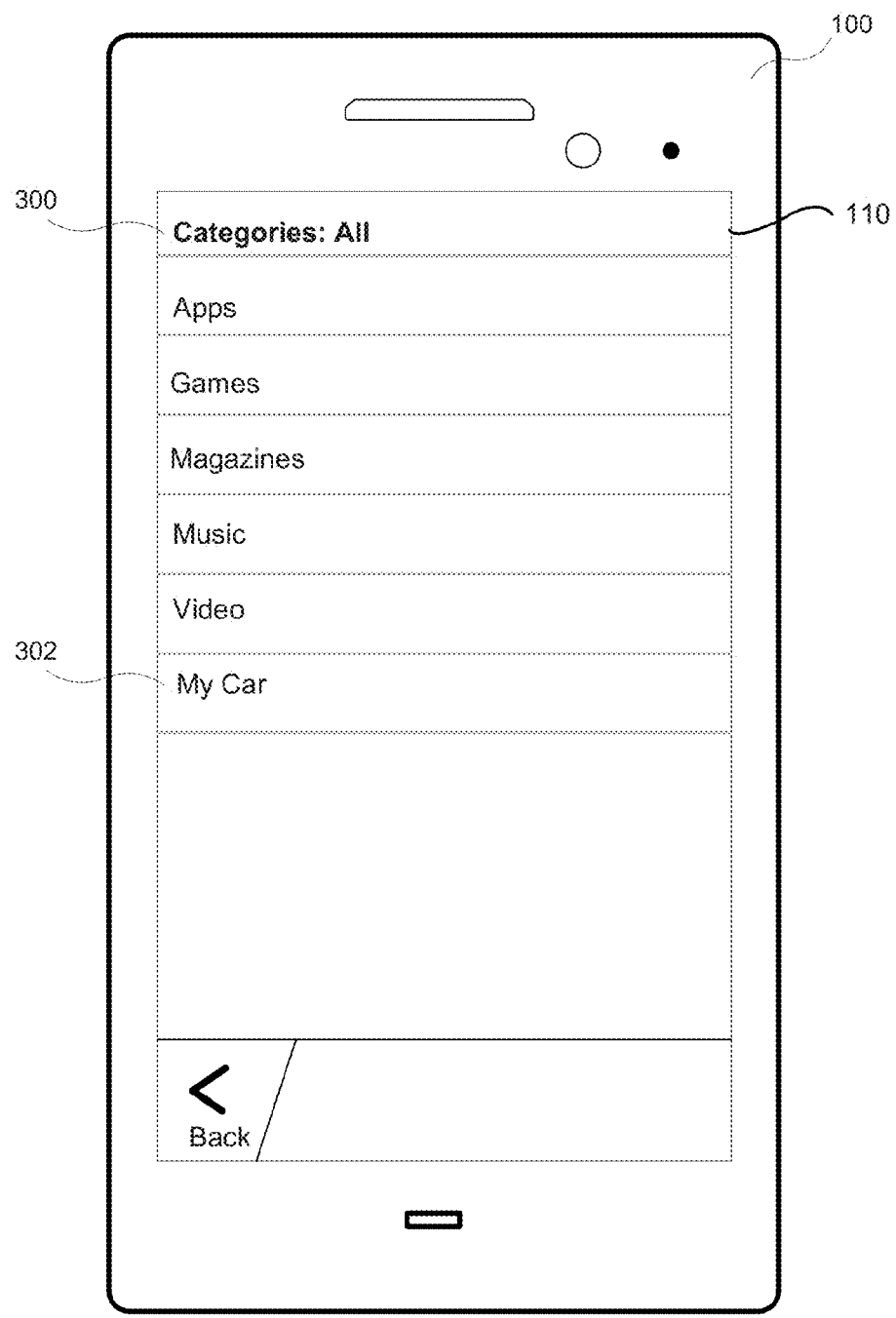
FIG. 3 shows a representation of display screen on a mobile device for presenting content based upon the paired device identification information.
Figure 4:
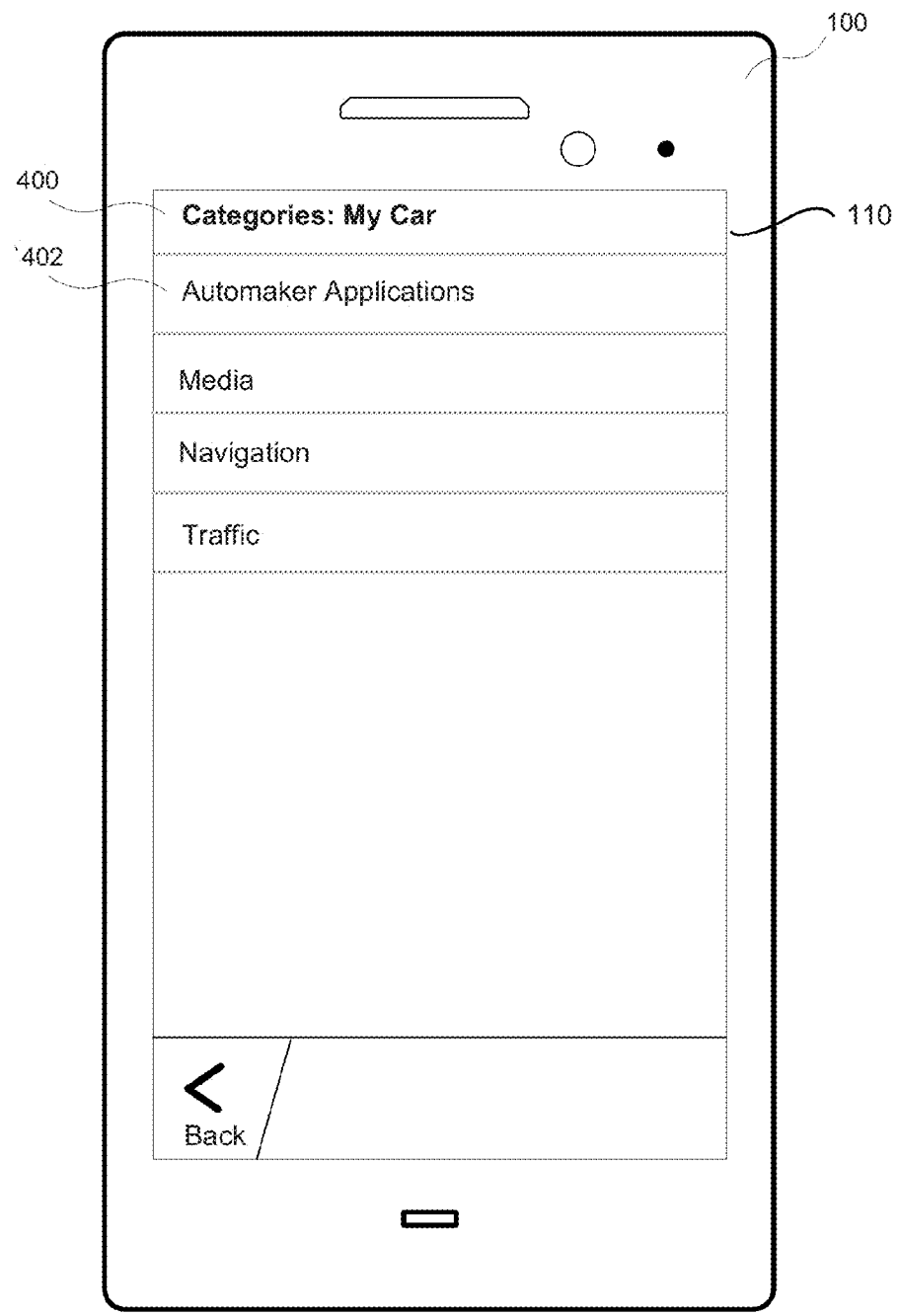
FIG. 4 shows a representation of display screen on a mobile device for presenting a category selection based upon the paired device identification information.
Figure 5:
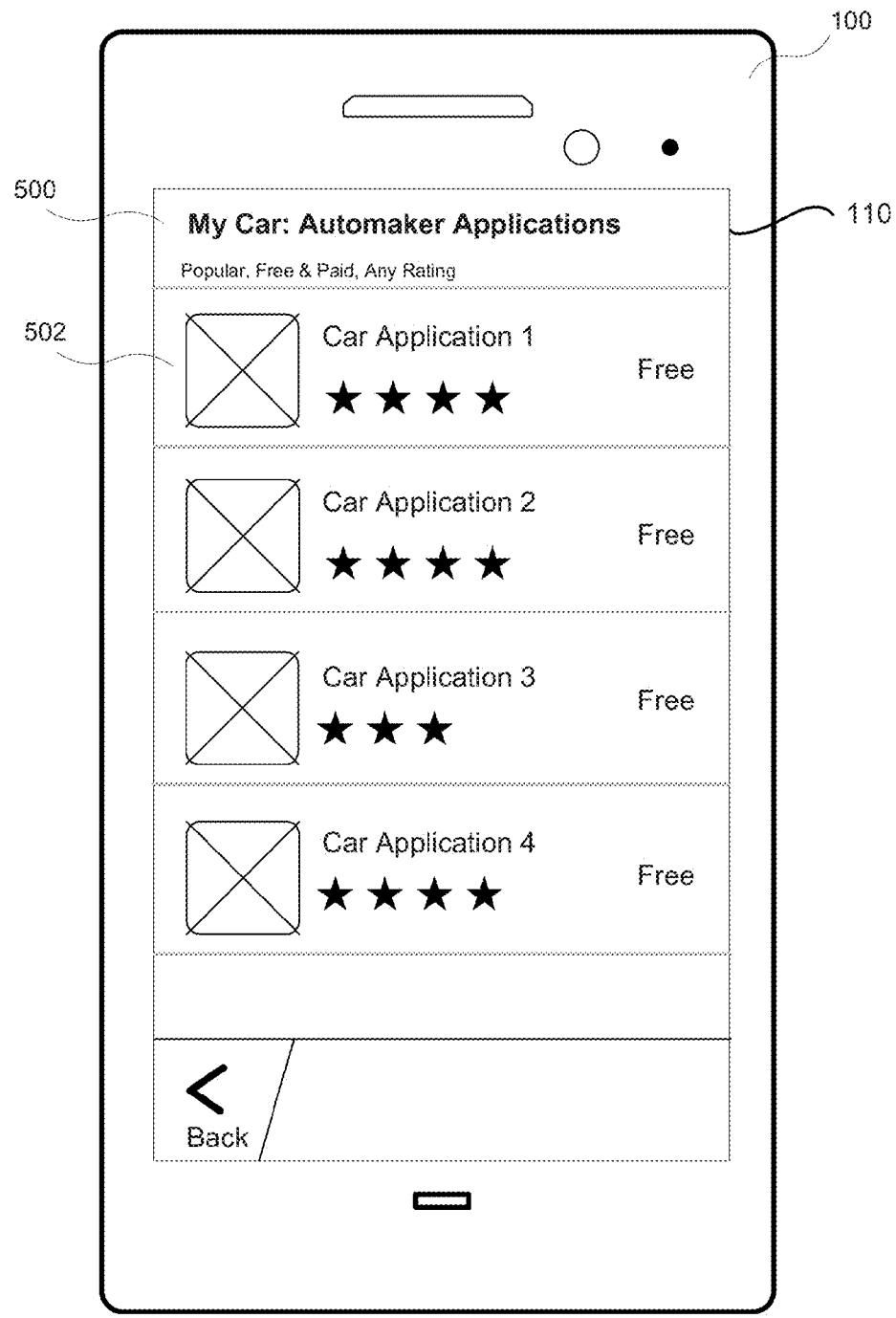
FIG. 5 shows a representation of display screen on a mobile device for presenting applications based upon the paired device identification information.

FIG. 3 shows a representation of display screen on a mobile device 100 for presenting content based upon the identity of the paired in-vehicle infotainment system 150. When requesting content such as in an application store, a list of categories 300 can be presented to the user to select different groupings or views. Based upon the paired device identity information 204 stored in the device a category can be presented, in this example 'My Car' 302 which provides applications associated with the vehicle or in-vehicle infotainment system 150 paired to the mobile device 100. As shown in FIG. 4, a subsequent display screen 400 is shown when the user selects the category 'My Car' 302; further categories can be displayed related to the category. For example 'Automaker Applications' category can be displayed to provide applications created, endorsed or approved by the automaker, for the particular automaker, brand, make and/or model. Additional categories may be displayed providing applications that either other users with the same vehicle have downloaded, applications that are complimentary to the functions of the paired device or provide functions not present on the paired device. As shown in FIG. 5, the display screen 500 is provided if the user selects the 'Automaker Applications' category 402, the applications 502 are displayed and can be downloaded and installed on the mobile device 100.

Figure 6:
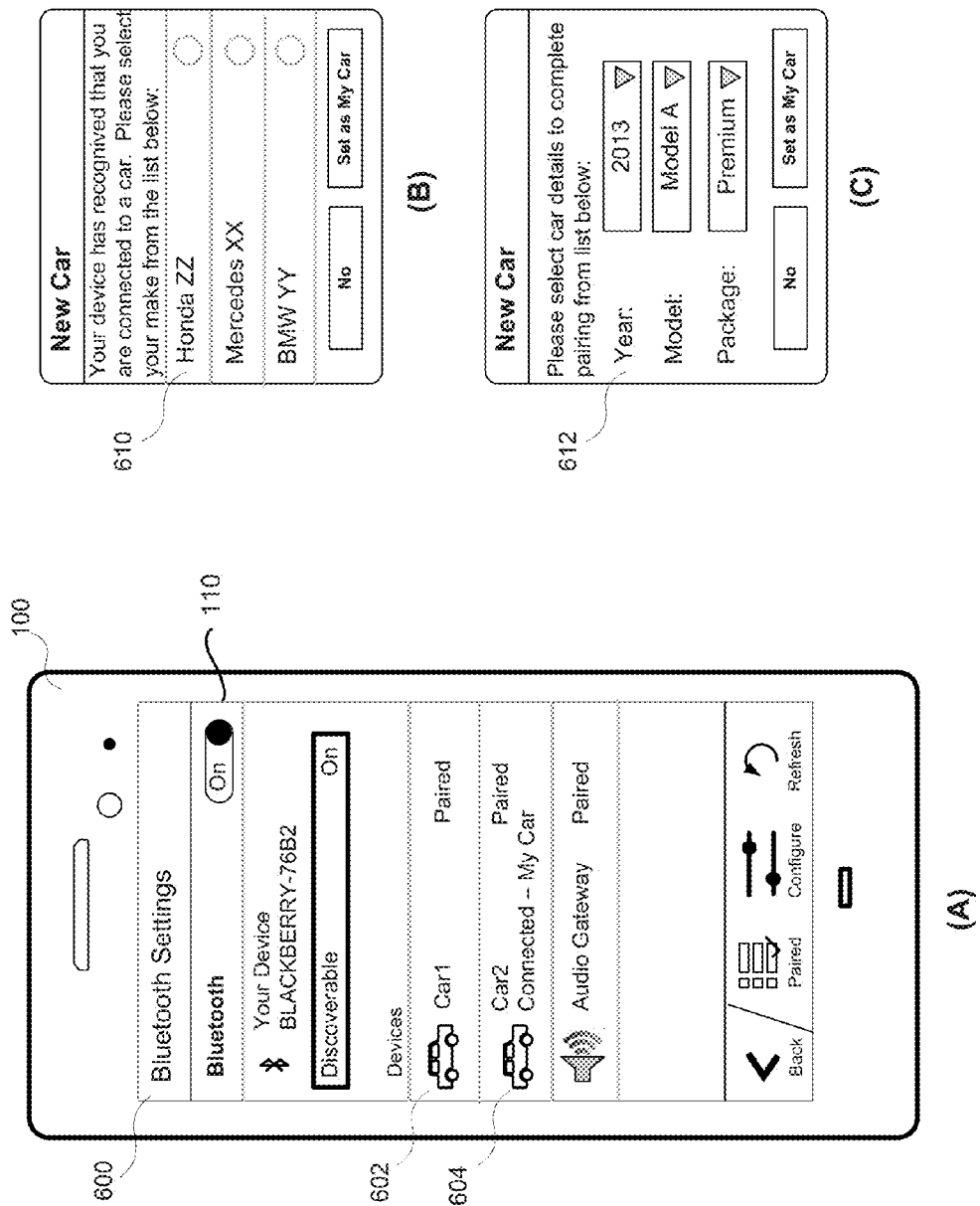
FIGS. 6A to C shows a representation of a display screen on a mobile device for receiving further vehicle identification during the initial pairing process.

FIG. 6 shows a representation of a display screen on a mobile device 100 for receiving further vehicle identification during the initial pairing process. During the pairing process between the mobile device 100 and the in-vehicle infotainment system 150, the mobile device 100 may be able to identify that the received device identifier is associated with a vehicle. The pairing menu 600 identifies that the mobile device 100 is paired to 'Car1' 602 and also identifies that the mobile device 100 is also paired to 'Car2' 604. The paired device identifier may provide additional levels of detail, for example identify the make, brand, model and option packages in the device identifier. If the device identifier does not provide sufficient identification information, but can be at least identified as a vehicle, an additional pairing screen or pop-up such as in FIGS. 6B and 6C may be displayed to allow the user to provide additional selections. Depending on the type of behavior profile that may be defined on the mobile device 100, granularity as to the auto manufacturer of the car may be selected as shown in screen 610 or further details such as year of manufacture, model, and package as shown in screen 612 may be presented on the mobile device 100 to narrow the selection to particular manufacturer. The screens 610 and 612 may be presented during the initial pairing process and may not be present on each subsequent device pairing. The paired device 604 may be labelled or identified as a preferred device for which paired device identity information is provided; in this example the label is 'My Car'. This label may be utilized in presentation of the content through other applications so that the user knows what the relevant content that is provided is associated with. In storing the device identity information, if two paired device identities are present that are similar, additional information such as media access control (MAC) address may be utilized to distinguish between the two and enable presentation of content to be tailored to individual vehicles.

Figure 7:
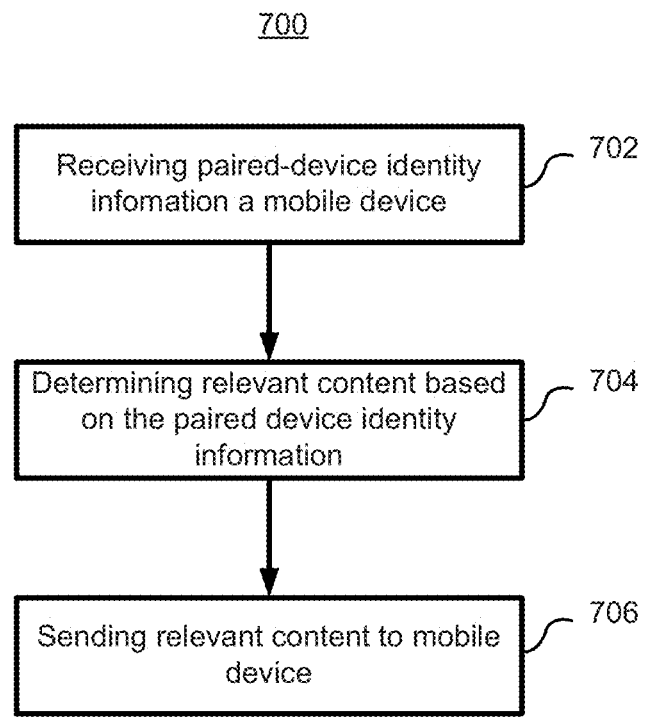
FIG. 7 shows a method flow of server behavior based on paired device identification information.

FIG. 7 shows a method flow of server behavior based on paired device identification. The method 700 commences with the mobile device accessing a content provider such as application store or content provider website provided by a server 212. When accessing the content source, the user of the mobile device 100 may be associated with a user identifier or mobile device identifier which enables selection of content to be tailored to the user or the device. If the mobile device is, or has been, paired with a device already, information of the paired device may be utilized to define, or refine, the type of content that should be provided. When accessing the content provider the user identifier (or mobile identifier) is provided in addition to paired device identity information and is received at the server 212 of the content provider (702). For example if the paired device identity information is associated with an automaker the name of the automaker, or an identifier that can be used to identify the name of the automaker, would be provided to the server 212, however only a subset of the paired device identity information may be necessary to be provided to the server 212. Based upon the received paired device identity information, relevant content can be determined for presentation to the user of the mobile device (704). For example if the paired device identity information is associated with a particular auto manufacturer, content can be presented that is created, approved or endorsed by the auto manufacturer. The content may be in the form of applications in an application store, website presentation, or application configurations. The relevant content determined to be relevant to the user of the mobile device based on the paired device identity information is then sent from the server 212 to the mobile device 100 which would then be presented to the user of the mobile device 100 (706). The sending of relevant content to the mobile device 100 may include sending selection information for the relevant content followed by sending of selected relevant content after one or more selections are made by a user of the mobile device 100.

Figure 8:
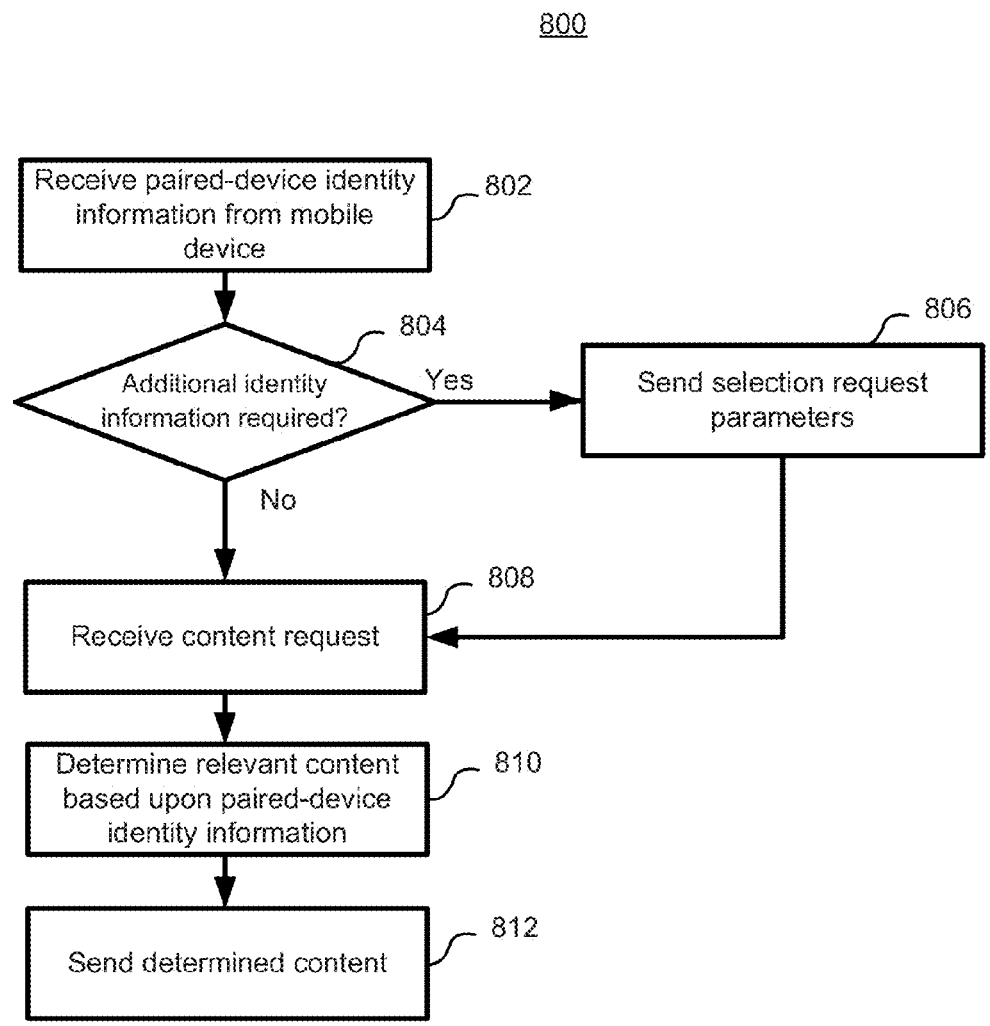
FIG. 8 shows a method flow of device pairing and server behavior based on paired device identification information.

FIG. 8 shows a method flow of device pairing and server behavior based on paired device identification. Paired device identity information is received by the server 212 (802). The paired device identity information provides information that can be used to identify a product, device or product or device information that is associated with a product or device that has been paired with the mobile device 100. If additional information is required to further distinguish a product or device (Yes at 804) by the server 212 a request may optionally be sent to the mobile device 100 for additional selection parameters (806) for example information such as year, model and make may be requested to be provided. If sufficient information is provided with the paired device identity information (No at 804) the content request is received (808) by the server 212. It should be noted that the content request may be included with the paired device identity information or may be provided separately. The paired device identity information may be only provided during initial connection to, or provided with each request sent to, the server 212. Content associated or assigned to device identity information corresponding to the pair device identity information provided can then be selected (810) and sent from the server 212 to the mobile device 100 (812).

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

What is claimed:

1. A method on a server comprising:
receiving from a mobile device through a wide area network (WAN), paired device identity information associated with an in-vehicle infotainment system (IVIS) of a vehicle that has been previously paired to the mobile device through a personal area (PAN) network connection;
determining content available from the server that can be executed or displayed on the mobile device based upon parameters associated with the IVIS provided by the paired device identity information when the mobile device is not connected to the IVIS of the vehicle; and
sending the determined content to the mobile device through the WAN, the content for execution or display on the mobile device independently of the IVIS;
wherein the content comprises identification of one or more applications that are identified as being associated with the received paired device identity information for execution on the mobile device based upon the paired device identity information, each of the one or more applications configuring the mobile device to perform an operation provided by the application.

2. The method of claim 1 wherein receiving the paired device identity information further comprises:
sending selection parameters to the mobile device to further define the paired device identity information;
receiving a selection of the selection parameters from the mobile device; and
determining additional paired device identity information from the selection of the selection parameters.

3. The method of claim 2 wherein the selection parameters identify one or more of: an auto manufacturer, a model, a year of manufacture, an option package.

4. The method of claim 1 wherein the paired device identity information is associated with an automobile manufacturer.

5. The method of claim 4 wherein the content comprises one or more applications that are associated with the automobile manufacturer.

6. The method of claim 5 wherein the paired device identity information identifies one or more of: an automaker, a model, a year of manufacture, an option package.

7. The method of claim 1 wherein the paired device identity information is associated with a Bluetooth device address or a Wi-Fi direct device address.

8. The method of claim 1 wherein the paired device identity information is determined from a paired device identity identifier.

9. A server comprising:
a processor; and
a non-transitory memory coupled to the processor, the memory containing instructions which when executed by the processor performing:
receiving from a mobile device through a wireless network, paired device identity information associated with an in-vehicle infotainment system (IVIS) of a vehicle that has been previously paired to the mobile device through a personal area (PAN) network connection;
determining content available from the server that can be executed or displayed on the mobile device based upon parameters associated with the IVIS provided by the paired device identity information when the mobile device is not connected to the IVIS of the vehicle; and
sending the determined content to the mobile device through the wireless network, the content for execution or display on the mobile device independently of the IVIS;
wherein the content comprises identification of one or more applications that are identified as being associated with the received paired device identity information for execution on the mobile device based upon the paired device identity information; each of the one or more applications configuring the mobile device to perform an operation provided by the application.

10. The server of claim 9 wherein receiving the paired device identity information further comprises:
sanding selection parameters to the mobile device to further define the paired device identity information;
receiving a selection of the selection parameters from the mobile device; and
determining additional paired device identity information from the selection of the selection parameters.

11. The server of claim 10 wherein the selection parameters identify one or more of: an auto manufacturer, a model, a year of manufacture, an option package.

12. The server of claim 9 wherein the paired device identity information is associated with an automobile manufacturer.

13. The server of claim 9 wherein the paired device identity information identifies one or more of: an automaker, a model, a year of manufacture, an option package.

14. The server of claim 9 wherein the paired device identity information is associated with a Bluetooth device address or a Wi-Fi direct device address.

15. The server of claim 9 wherein the paired device identity information is determined from a paired device identity identifier.

* * * * *